United States Patent [19]

Morris et al.

[11] Patent Number: 4,538,219
[45] Date of Patent: Aug. 27, 1985

[54] MULTIWINDING INDUCTOR AND ASSOCIATED APPARATUS

[75] Inventors: David Morris, Woodbridge; Albrecht Schwarz, North Caldwell, both of N.J.

[73] Assignee: International Telephone and Telegraph Corporation, New York, N.Y.

[21] Appl. No.: 514,138

[22] Filed: Jul. 15, 1983

[51] Int. Cl.³ .......................................... H02M 3/335
[52] U.S. Cl. ...................................... 363/26; 363/97; 363/134
[58] Field of Search ....................... 363/16, 24, 25, 26, 363/97, 123, 134, 20, 21

[56] References Cited

U.S. PATENT DOCUMENTS 4,300,191 11/1981 Baranowski et al. ................. 363/26

*Primary Examiner*—Peter S. Wong
*Assistant Examiner*—Anita M. Ault
*Attorney, Agent, or Firm*—John T. O'Halloran

[57] ABSTRACT

A multiwinding inductor is disclosed which inductor is employed in a power control circuit. The power control circuit is of the type having a transformer which has a center tapped primary winding coupled to and associated with a plurality of secondary windings. The primary winding of the transformer is switched by means of switching devices during a power control operation. The inductor has a first winding in the primary which winding has one terminal coupled to the center tap and a second terminal coupled to a generator and a filter arrangement. Another winding of the inductor designated as a free wheeling winding is in series with an auxiliary impedance and has one terminal coupled to the common terminal of the switching devices and a second terminal coupled through a rectifier to the generator. At least two additional windings of the inductor are coupled to suitable rectifier circuits associated with the secondary windings of the transformer. The operation of the inductor causes energy which is stored in the secondary windings to be returned to the generator during circuit operation by means of the free wheeling winding and auxiliary impedance to thereby increase the overall efficiency of the circuit as well as to reduce the magnitude of the filter capacitors employed in such circuits.

19 Claims, 7 Drawing Figures

MULTIWINDING INDUCTOR AND ASSOCIATED APPARATUS

BACKGROUND OF THE INVENTION

This invention relates to power inductors in general and more particularly to an improved inductor having multiple windings for use in power circuits.

There are a great many circuits which employ multiple winding inductors for the conversion, control and conditioning of electric power. Essentially, such inductors are employed in the field of power electronics. In this field the primary characteristics of electric power which are subject to control includes its basic form (AC or DC), its effective voltage or current, its frequency and power factor. The control of electric power is frequently desired as a means for achieving control or regulation of one or more nonelectrical parameters as for example the speed of a motor, the temperature of an oven, the intensity of lighting as well as the conversion of power from one form to another such as from AC to DC or from DC to AC.

In order to perform such control, there are hosts of known circuits which have been generally utilized in the field of power electronics. Such circuits are designated as power conditioners, converters, inverters, power supplies and motor controls. Essentially, these particular circuits as well as many others operate to control or distribute power in a specified environment and for a particular purpose.

As such, all of the above circuits employ inductors to implement the efficient transfer of such power. The main factor is designing any inductor for use in such circuits is to provide a device that has a minimum leakage inductance between the multiwindings. One must understand that while an inductor and a transformer appear to be similar devices, they are, in fact, quite different. A transformer is intended to couple energy and energy storage is undesirable, while an inductor is primarily intended to store energy. This difference is important as many of the above noted circuits employ both transformers and inductors.

The prior art was concerned with providing an efficient multiwinding inductor which could operate efficiently and reliably in the type of circuits as indicated above. In fact, the prior art is replete with many articles and patents which attempt to show the design and construction of multiwinding inductors for different circuit applications. See for example an article entitled "Designing Optimal Multi-Output Converters with a Coupled Inductor Current-Driven Topology" by L. H. Dixon, Jr., and C. J. Baranowski, a paper presented at the Powercon Eight Convention in Dallas, Tex. in April, 1981. This paper examines the relative merits of several topology approaches to the design of multiple-output switching power converters. The paper describes a design approach using a coupled inductor current-driven (CICD) buck regulator topology, with emphasis on the optimal design of the coupled inductor in order to minimize its leakage reactance. The paper is available through the Unitrode Corporation of Lexington, MA. This paper, as well as many other articles, attempts to define the construction and implementation of an inductor for use in the field of power electronics.

In any event, the prior art attempts to generally improve circuit operation and improve the efficiency of the inductor have failed to solve the many problems attendant with such circuits. It is, therefore, an object of the present invention to provide a unique form of inductor and associated circuitry in which the inductor is incorporated.

It is another object of this invention to provide an improved inductor and circuitry which exhibits an increased overall efficiency together with a substantial reduction of the magnitude of filter capacitors necessary in the circuit.

It is still a further object of the present invention to provide a multiwinding inductor or choke exhibiting unique properties in order to enable the same to operate in a multiplicity of power control circuits, as for example multi-output power supplies, inverters and so on.

DESCRIPTION OF THE PREFERRED EMBODIMENT

In a power control circuit, said power control circuit of the type employing a transformer having a primary winding with a center tap and at least three secondary windings, said primary winding having first and second terminals coupled to switching devices for selectively controlling the power applied to said winding during a first free wheeling mode when both switching devices are off and during a second power stroke mode when at least one switching device is on with the on time plus the off time equal to the period of said circuit, said switching devices having an input terminal adapted to be coupled to a source of power to be controlled, in combination therewith an improved multiwinding inductor comprising a first winding ($N_p$) having one terminal coupled to said center tap of said primary winding and a second terminal adapted to coupled to said power source, a second winding ($N_3$) of said inductor having one terminal coupled through a rectifier to said second terminal of said first winding and a second terminal of said second winding coupled through an auxiliary impedance to said input terminal of said switching devices, a third winding ($N_1$) of said inductor coupled to a first one of said secondary windings of said transformer, and a fourth winding ($N_2$) of said inductor coupled to a second one of said secondary windings of said transformer, whereby said third secondary winding has no winding associated with said inductor, with said second winding of said inductor and said auxiliary impedance operative to transfer back stored energy in said circuit to said power source during said free wheeling mode.

DETAILED DESCRIPTION OF THE INVENTION

Figure 1:
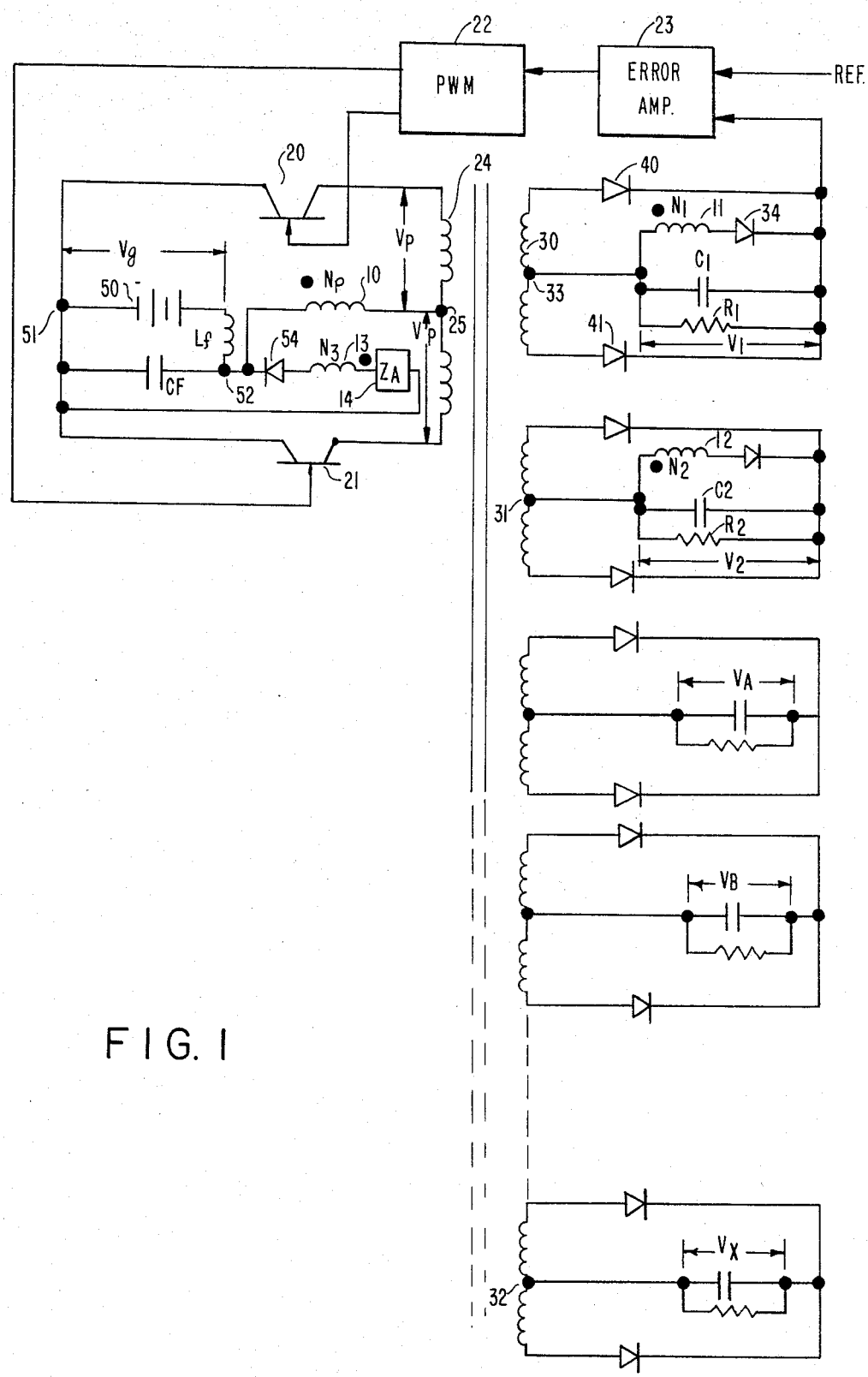
FIG. 1 is a schematic diagram of a multi-output power supply employing the improved inductor according to this invention.

Referring to FIG. 1, there is shown an example of a multiwinding inductor according to this invention.

The inductor basically consists of four windings designated as $N_P$, $N_1$, $N_2$ and $N_3$ which are respectively indicated by reference numerals 10, 11, 12, and 13. An important aspect of the inductor is that it also includes an auxiliary impedance 14 and designated as $Z_A$. This impedance appears in series with winding 13 which is the $N_3$ winding.

The above noted circuit as will be further explained is given by way of example and essentially is a multi-output power supply. The circuit shown in a current-fed inverter but, as will be explained, the basic inductor can be employed in other types of circuits such as a voltage fed inverter a switching preregulator, (either buck or boost) which can be used ahead of the inverter or the inverter can be used as a preregulator.

The circuit of FIG. 1 includes two switching transistors 20 and 21. The transistors are shown in general manner ignoring the conductivity of the same as NPN or PNP. The use of such transistors in inverter circuits is well known and many examples exist in the prior art. In any event, the base electrodes of the transistors are coupled to a pulse width modulator circuit 22. The pulse width modulator is also well known in the field of power electronics and many examples of such modulators exist. For example, see a text entitled *Electronics Engineer's Handbook,* Second Edition by D. G. Fink and C. Christianson, published 1982 by McGraw Hill, Inc. Chapter 15 entitled "Power Electronics" has a complete description starting at Page 15 to Page 40 designated as pulse width modulation (PWM). This text as well as many others describes pulse width modulation circuits used in various power applications. As is also conventional, the pulse width modulator is controlled by means of an error amplifier 23 having one input coupled to an output of the power supply, and one input coupled to a reference potential. In this manner, the switching of the transistors 20 and 21 is controlled by the pulse width modulator 22 which is regulated by the error amplifier 23. An appropriate electrode such as the collector or emitter of transistor 20 and 21 is connected to a primary winding of a transformer 24.

Basically, the primary winding of the transformer 24 consists of two equal windings having a center tap 25. The other electrodes of the transistors 20 and 21 such as the collectors or emitters are coupled together as shown. The transformer 24 possesses a plurality of secondary windings such as 30, 31, 32 and so on. Each secondary winding has a center tap and includes a full wave rectifier circuit having associated diodes such as 40 and 41 associated with winding 30 to generate various output voltages for use in the power supply configuration.

In regard to the inductor, according to this invention and as indicated, the windings of the inductor are $N_P$ which is the power stroke winding and is the winding that is effective during the time that energy is stored in the primary. Windings $N_1$ and $N_2$ are associated with the secondary windings of the transformer and utilize part of the stored energy during the free wheeling mode. Winding $N_3$ which is on the primary side delivers the remainder of stored energy power to the generator $V_G$ and back to the capacitor $C_F$.

The term "power stroke" is employed in the field to designate the time during which either transistor as 20 or 21 is on. The term "free wheeling" is used to designate the time both transistors as 20 and 21 are off or nonconducting. The format of the circuit is as follows: The winding $N_P$ has one terminal connected to the center tap 25 of the primary winding 24. The generator designated as $V_G$ and by reference numeral 50 is shown as a battery and has one terminal connected to the common terminal 51 formed by the connection of the respective electrodes of transistors 20 and 21. The other terminal of the battery is connected through an inductor $L_F$ to a terminal 52. Connected between terminals 51 and 52 is a capacitor $C_F$. The other terminal of winding $N_P$ is connected to terminal 52. The winding $N_3$ has one terminal connected to the auxiliary impedance 14 whose other terminal is connected to terminal 51. The other terminal of winding $N_3$ is connected through a diode 54 to terminal 52. The inductor $L_F$ and the capacitor $C_F$ are used for reducing the EMI generated by the inverter and feedback to the generator. The primary winding is associated with a plurality of secondary windings as indicated with windings such as $V_A$, $V_B$, and $V_X$ being additional rectifier windings which do not have any common winding from the improved inductor according to this invention.

Thus, as can be seen, only secondary windings 30 and 31 have common windings as $N_1$ and $N_2$ which are associated with windings $N_P$ and $N_3$ of the improved inductor. The diode 54 is employed to prevent winding $N_3$ from conducting during the power stroke operation. By employing the diode 54, one, therefore, prevents the winding $N_3$ from exhibiting transformer action during the power stroke. Essentially, the function of the winding $N_3$ is to take a portion of the energy stored in the core during the power stroke and direct and same back to the generator 50.

The circuit shown in FIG. 1 has one immediate advantage and distinction over the prior art circuits. The present state of the art circuits which employ multiwinding inductors utilize separate windings of the inductor for each output rectifier section. Thus, for example, if there are eight secondary windings, such as windings 30, 31, 32 and so on, one would require eight free wheeling windings in each secondary such as $N_1$, $N_2$, $N_X$ and one power stroke winding. This is true even if the majority of the power delivered is in the first rectifier section such as section 30. This, of course, results in the larger and more expensive multiwinding inductor. Furthermore, the number of additional rectifiers used in the free wheeling windings must equal the number of output rectifier sections. For example, secondary winding 30 has its center tap 33 connected to one terminal of the free wheeling winding $N_1$. The other terminal of $N_1$ is connected via a rectifier 34 to the junction between the cathodes of rectifiers 40 and 41. The series combination of winding $N_1$ and rectifier 34 is paralleled by capacitor $C_1$ and resistor $R_1$.

As can be seen, the secondary winding 31 associated with free wheeling winding $N_2$ also possesses the same circuitry. The purpose of the rectifier 34 is to prevent conduction of winding $N_1$ during the free wheeling mode and essentially serves the same purpose as rectifier 54 in series with winding $N_3$. It is seen from the Figure that the additional rectifier windings designated by voltages $V_A$, $V_B$ and $V_X$ do not have the free wheeling winding and hence do not have the additional diodes. This is not true of the prior art circuitry. In the prior art circuits the losses involved in all the free wheeling windings including the losses in the free wheeling rectifiers reduce the efficiency of the overall circuit.

In the circuit of FIG. 1, based on the improved inductor, only the heavy current rectifier sections such as 30 and 31 use and employ the free wheeling windings. For example, if one uses eight output rectifier sections with only two sections delivering heavy current, then only three free wheeling windings are needed which are windings $N_1$, $N_2$ and $N_3$. A major factor of this inductor and of this invention concerns the auxiliary impedance $Z_A$ which is in series with the free wheeling winding $N_3$.

Figure 2:
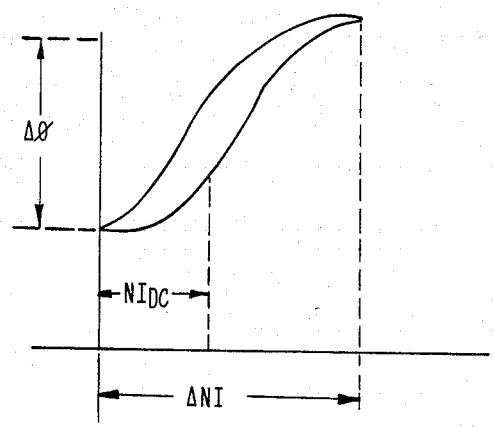
FIG. 2 is a graph depicting the hysteresis loop of the inductor.
Figure 3:
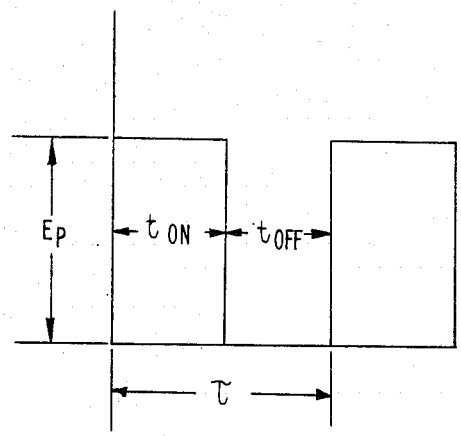
FIG. 3 is a graph depicting the voltage across the parallel winding of the inductor during a power stroke.
Figure 4:
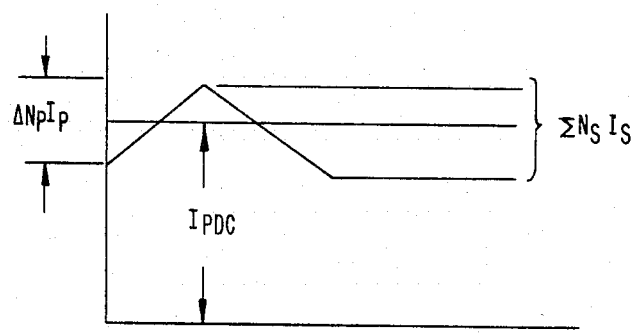
FIG. 4 is a graph depicting the ampere turn characteristic of the inductor.

Based on the above structure, there will be shown the derivation of the equations which dictate the turns ratio of the new inductor and the reasons for using the auxiliary impedance $Z_A$ which include the methods of implementing the same. The inductor characteristics including the magnetics are shown in FIGS. 2 to 4. FIG. 2 depicts the minor magnetic loop (the minor hysteresis loop) of the new inductor.

FIG. 3 depicts the voltage across the winding $N_P$ during the power stroke.

FIG. 4 depicts the ampere turn characteristics of the new inductor. The inductor basically, as will be further described, utilizes a linear permeability core which is not a square loop core. Such cores are widely available and may be a permalloy core, linear ferrite, a linear silicon steel core and so on. For high frequency operation, one may employ a core fabricated from powdered iron. The pertinent equations are as follows:

$$KE = \frac{N d\phi}{dt} \quad \Delta\phi = \int \frac{KE\,dt}{N} = \text{conventional volt time integral}$$

Where $K = $ constant $$= \frac{d\phi}{dt} \times 10^{-8}$$

$N = $ number of turns for any one of the four windings.

$$\Delta\phi = \frac{KEt}{N} \text{ and for any winding } N_x \quad (1)$$

$$\Delta\phi = \frac{KE_x t_x}{N_x} \quad (2)$$

Now during power stroke (assume that 20 is closed and 21 is opened) with $E_p = $ Voltage across $N_P$ of inductor:

$$\Delta\phi = \frac{KE_p t_p}{N_p} \text{ where } t_p = t \text{ on } = \text{time of power stroke} \quad (3)$$

when 20 opens and before 21 closes (This is dead time, when both switches are open), the flux $\phi$ must collapse and equal to $\Delta\phi$. This results in:

$$\frac{KE_p\,t\text{ on}}{N_p} = \frac{K V_1\,t\text{ off}}{N_1} = \frac{K V_2\,t\text{ off}}{N_2} = \frac{K V_3\,t\text{ off}}{N_3} \quad (4)$$

$$\frac{E_p\,t\text{ on}}{N_p} = \frac{V_1\,t\text{ off}}{N_1} = \frac{V_2\,t\text{ off}}{N_2} = \frac{V_3\,t\text{ off}}{N_3} \quad (4A)$$

Where $V_1$, $V_2$ and $V_3$ are generated voltages
Derivation of ampere turn equation and resultant turns ratio evaluation:

During the power stroke, the magnetomotive force required for flux excursion $\Delta\phi$ is given by $K^1 N_P \Delta I_P$. During the free wheeling stroke as the flux collapses by $\Delta\phi$, the resulting change in magnetomotive force is $K^1 \Sigma \Delta(N_s I_s)$ where:

$$\Delta(N_s I_s) = \Delta N_1 I_1 + \Delta N_2 I_2 + \Delta N_3 I_3 \quad (5)$$

Therefore:

$$K^1 \Delta I_p N_p = K^1 [\Delta I_1 N_1 + \Delta I_2 N_2 + \Delta I_3 N_3] \quad (6)$$

and $$\Delta I_p = \Delta I_1 \frac{N_1}{N_p} + \Delta I_2 \frac{N_2}{N_p} + \Delta I_3 \frac{N_3}{N_p} \quad (7)$$

Also $$I_{FDC} = I_{1DC} \frac{N_1}{N_p} + I_{2DC} \frac{N_2}{N_p} + I_{3DC} \frac{N_3}{N_p}$$

But from equation (4A)

$$E_p\,t \text{ on } N_1 = V_1\,t\text{ off } N_p = E_p\,t\text{ on } N_x = V_x\,t\text{ off } N_p$$

for any winding $N_x$:

$$\frac{N_x}{N_p} = \frac{V_x\,t\text{ off}}{E_p\,t\text{ on}} \text{ or } \frac{N_1}{N_p} = \frac{V_1\,t\text{ off}}{E_p\,t\text{ on}}; \quad (8)$$

$$\frac{N_2}{N_p} = \frac{V_2\,t\text{ off}}{E_p\,t\text{ on}}; \quad \frac{N_3}{N_p} = \frac{V_3\,t\text{ off}}{E_p\,t\text{ on}}$$

Let $\alpha = \frac{t\text{ off}}{E_p\,t\text{ on}} \therefore \frac{N_1}{N_p} = V_1[\alpha]; \frac{N_2}{N_p} = V_2[\alpha]; \frac{N_3}{N_p} = V_3[\alpha]$ and substituting in equation (7) yields:

$$\Delta I_p = \Delta I_1 V_1 \alpha + \Delta I_2 V_2 \alpha + \Delta I_3 V_3 \alpha \quad (9)$$

$$\text{Or } \frac{\Delta I_p}{\alpha} = \Delta I_1 V_1 + \Delta I_2 V_2 + \Delta I_3 V_3 \quad (10)$$

Assuming only $I_3$ is unknown, since the circuit specifications and design (parameters) are either given or selected:

$$\Delta I_3 = \frac{\frac{\Delta I_p}{\alpha} - \Delta I_1 V_1 - \Delta I_2 V_2}{V_3} \quad (11)$$

Also $$I_{3DC} = \frac{\frac{I_{pDC}}{\alpha} - I_{1DC} V_1 - I_{2DC} V_2}{V_3} \quad (12)$$

The above equation dictate the turns ratio and the amount of current flowing back into $C_f$ and $V_g$; (Depending on ratio of $X_{LF}$ to $X_{CP}$)

The equations in therms of duty cycle $\delta$ and period $\tau$ will now be derived:

$$t\text{ on}/\tau = \delta = \text{duty cycle}$$

$$t\text{ off} = \frac{\tau - t\text{ on}}{\tau} = \frac{\tau - \delta\tau}{\tau} = 1 - \delta$$

$$\frac{t\text{ off}}{t\text{ on}} = \frac{1 - \delta}{\delta} = \frac{1}{\delta} - 1$$

-continued $$\frac{N_x}{N_p} = \frac{V_x}{E_p}\left(\frac{t\text{ off}}{t\text{ on}}\right) = \frac{V_x}{V_p}\left(\frac{1-\delta}{\delta}\right) \quad (13)$$

The equation 13 therefore specifies the turns ratio required by the magnetics to completely specify the inductor based on the output voltages and the primary voltage. As indicated above, in order to achieve optimum efficiency, one requires that the auxiliary impedance 14 ($Z_A$) be included in the circuit. If the impedance $Z_A$ were not in the circuit, the circuit shown with the four winding inductor would work satisfactorily only at one input voltage which, for example, would be $V_G = V_G1$. At any lower a voltage, the $N_3$ winding would be forced to conduct to the lower voltage thereby transformer action during conduction would prevent some of the stored energy present in the other windings from being returned to the generator and thus reduce the efficiency.

Since the closed loop system always attempts to keep $V_1$ constant, and, based on the error amplifier, all secondary voltages are kept constant, the reduced effect of having $N_3$ conduct and exhibit clamping reduces the efficiency. To prevent this clamping of the $N_3$ winding, the auxiliary impedance $Z_A$ is inserted in series with $N_3$ so that $N_3$ becomes unclamped, with the auxiliary impedance taking up the excess voltage that is induced in winding $N_3$.

In this manner, the auxiliary impedance may be a saturable reactor, a magnetic amplifier or may be a designed leakage in the $N_3$ of the four winding coil. Preferably, the auxiliary impedance should be a nondissipative impedance. This is because, for the best effect, the auxiliary impedance must be programmed in such a way that it will absorb the excess voltage induced in $N_3$ (from that induced in the clamped voltage mode) as the generator voltage $V_G$ is increased from minimum condition to the value $V_{G1}$. A programmed auxiliary voltage can also be used instead of $Z_A$ which voltage opposes the excess voltage.

With the above in consideration, if one were to derive the turns ratio for a conventional multiwinding state of the art inductor which does not have the free wheeling winding $N_3$ and the impedance $Z_A$. The following equation will be evidenced:

$$\frac{N_{LP}}{N_{LSX}} = \frac{N_P}{N_{SX}}\left[\frac{\tau}{t\text{ on}} - 1\right]\left[\frac{t\text{ on}}{\tau - t\text{ on}}\right] =$$

$$\frac{N_P}{N_{SX}}\left[\frac{\tau - t\text{ on}}{t\text{ on}}\right]\left[\frac{t\text{ on}}{\tau - t\text{ on}}\right] = \frac{N_P}{N_{SX}}$$

The above equation states that in the conventional state of the art multiwinding inductor, the turns ratio of the power stroke winding $N_{LP}$ to any other winding $N_{LSX}$ is equal to the turns ratio of the primary winding $N_P$ of the transformer to the corresponding secondary $N_{SX}$. This of extreme importance in emphasizing the difference of the new multiwinding inductor to the present state of the art inductor. It is clear that without $Z_A$ or $V_A$, winding $N_3$ of the multiwinding inductor will clamp thus removing some of the ampere turns from windings $N_1$ and $N_2$. This will reduce the effectiveness of the multiwinding inductance although it will still deliver energy to the corresponding loads and filter capacitors $R_1$, $C_1$, $R_2$ and $C_2$ as associated with windings 30 and 31. Another advantage of using the extra free wheeling winding $N_3$ of the inductor is that it provides energy to the input of the inverter during the off mode. This reduces the ripple capability required for the filter capacitor $C_F$. This results in a smaller and less costly capacitor than that which would be required if the extra free wheeling winding $N_3$ were omitted as in the prior art devices.

An example will now be given of how $Z_A$ or $V_A$ is programmed. Assume the circuit shown in FIG. 1 has eight outputs and secondary windings 30 and 31 constitute the heavy current outputs and assume that the currents are 36 amperes and 3.6 amperes respectively. The rectifier filter outputs are 5.6 volts and 19.7 volts respectively as $V_1$ and $V_2$. The free wheeling windings $N_1$ and $N_2$ provides energy to these two rectifier filters. The third winding $N_3$ supplies the excess stored energy to the input and including the diode voltage is equal to 29 volts. From equation 8, the multiwinding turns ratio is calculated as follows:

Let toff = 5.35 μsec; ton = 19.65 μsec; Ep = 6 volts $$\text{then } \alpha = \frac{t\text{off}}{t\text{ on } Ep} = \frac{5.35}{19.65 \times 6} = 0.454$$

$$\text{and } \frac{N_1}{N_p} = V_1\alpha = 5.6 \times 0.454 = 0.254$$

$$\frac{N_2}{N_p} = V_2\alpha = 19.7 \times 0.0454 = 0.894 \text{ and}$$

$$\frac{N_3}{N_p} = \alpha V_3 = 29 \times 0.0454 = 1.317$$

Figure 5A:
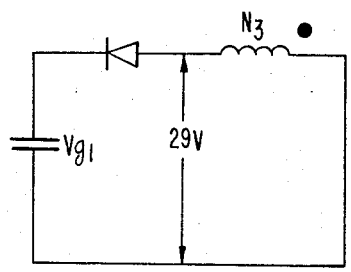
FIGS. 5A to 5C are a series of schematic diagrams depicting the equivalent circuit of FIG. 1 during the free wheeling mode.
Figure 5B:
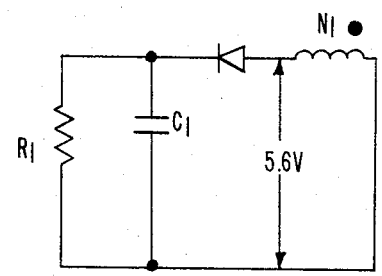
Figure 5C:
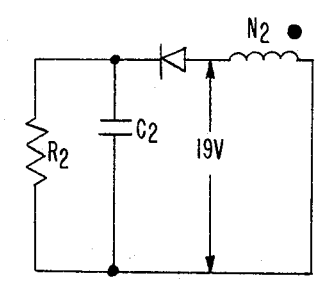

The equivalent circuit during the free wheeling mode is shown in FIGS. 5A to 5C. Thus, as can bee seen, the turns ratio:

$$\frac{N_3}{N_1} \text{ is } \frac{N_3/N_p}{N_1/N_p} = \frac{1.317}{0.254} = 5.197$$

$$\frac{N_3}{N_2} \text{ is } \frac{N_3/N_p}{N_2/N_p} = \frac{1.317}{0.894} = 1.477$$

Assume $V_g$ is reduced to 22 volts and $Z_A$ is omitted and loop is opened $N_3$ winding is now clamped to 22+1 (diode voltage)=23 volts and winding $N_1$ voltage is limited to 23/5.197=4.43 volts and winding $N_2$ voltage is limited to 23/1.477=15.58 volts Where if $Z_A$ were included $N_1$ voltage become 5.6 volts and $N_2$ voltage become 19.7 volts. Therefore the new multiwinding inductor with $Z_A$ will operate satisfactorily with (11) If $Z_A$ is used—it must be programmed to absorb 29−23=6 volts.

or

(12) if $V_{AUX}$ is used—it must be programmed to absorb 29−23=6 volts.

or $Z_A$ or $V_{AUX}$ must be programmed to absorb $V_{gl}-V_{gx}$.

Thus, as can be seen above, the use of the free wheeling winding $N_3$ in series with the auxiliary impedance $Z_A$ enables the maximum transfer of energy back to the generator to thereby enable the circuit to exhibit increased overall efficiency. The use of the winding further offers a substantial reduction in the magnitude of filter capacitors that are necessary in both the input and output sides of the circuit. As one can ascertain from the above description, the utilization of the free wheeling winding $N_3$ can be employed in various power control circuits such as those indicated above, all of which employ multiwinding inductors to enable efficient energy transfer during the switching modes associated with the various switching devices employed.

In the above example, the devices 20 and 21 were shown generally as transistors. It is, of course, understood that these devices may constitute switching diodes or other switching devices which are generally employed in such circuits.

We claim:

1. In a power control circuit, said power control circuit of the type employing a transformer having a primary winding with a center tap and at least three secondary windings, said primary winding having first and second terminals coupled to switching devices for selectively controlling the power applied to said winding during a first free wheeling mode when both switching device are off and during a second power stroke mode when at least one switching device is on with the on time plus the off time equal to the period of said circuit, said switching devices having an input terminal adapted to be coupled to a source of power to be controlled, the combination therewith of an improved multiwinding inductor, said inductor comprising:
a first winding ($N_P$) having one terminal coupled to said center tap of said primary winding and a second terminal adapted to be coupled to said power source a second winding ($N_3$) having one terminal coupled through a rectifier to said second terminal of said first winding and a second terminal of said second winding coupled through an auxiliary impedance to said input terminal of said switching devices, a third winding ($N_1$) of said inductor coupled to a first one of said secondary windings of said transformer, and a fourth winding ($N_2$) of said inductor coupled to a second one of said secondary windings of said transformer, whereby said third secondary winding has no winding associated with said inductor with said second winding of said inductor and said auxiliary impedance operative to transfer back stored energy in said circuit to said power source during said free wheeling mode.

2. The power control circuit combination according to claim 1, wherein said auxiliary impedance includes a saturable reactor.

3. The power control circuit combination according to claim 1, wherein said auxiliary impedance includes a magnetic amplifier.

4. The power control circuit combination according to claim 1, wherein said auxiliary impedance constitutes a leakage impedance associated with said second winding.

5. The power control circuit combination according to claim 1, wherein the turns ratio of any of said second, third or fourth windings are selected according to:

$$\frac{N_x}{N_p} = \frac{V_x}{V_p}\left(\frac{1-\delta}{\delta}\right)$$

Where
$N_x$ = turns ratio of said winding
$N_p$ = turns ratio of said first winding ($N_p$)
$V_x$ = voltage across said winding
$V_p$ = voltage across said first winding
$\delta = t_{on}/\tau$ = duty cycle
$t_{on}$ = time one switching device is on $\tau$ = the period of said circuit.

6. The power control circuit combination according to claim 1, wherein said inductor includes a linear permeability core.

7. The power control circuit combination according to claim 1, wherein said switching devices are selectively controlled by a pulse width modulator.

8. The power control circuit combination according to claim 1, wherein said switching devices are transistors.

9. An improved multiwinding inductor apparatus for use in a power control circuit comprising in combination:
a transformer having a primary winding with a center tap, and having magnetically coupled thereto a plurality of secondary windings with said primary winding having a first and second terminal, and with said secondary windings each having a first and a second terminal and an associated center tap;
a first switching device having a first electrode coupled to said first terminal of said primary winding;
a second switching device having a first electrode coupled to second terminal of said primary winding, said switching devices each having an output electrode coupled to one another and adapted to be coupled to a power source, said switching devices each having a control electrode for operating said devices in an on state or an off state to provide a free wheeling mode when both devices are off and a power stroke mode when either device is on,
first and second rectifiers with said first rectifier having one terminal coupled to said first terminal of a first secondary winding, and said second rectifier having one terminal coupled to said second terminal of said first secondary winding with said second terminals of said rectifiers coupled together,
third and fourth rectifiers with said third rectifier having one terminal coupled to said first terminal of said second secondary winding and with said fourth rectifier having one terminal coupled to said second terminal of said second secondary winding, with said other terminals of said rectifiers coupled together,
said multiwinding inductor having a first winding ($N_P$) with a first terminal connected to said center tap of said primary winding and a second terminal, a second winding ($N_3$) having one terminal connected to a terminal of an auxiliary impedance ($Z_A$) connected with the other terminal connected through a uni-directional current conducting device to said second terminal of said first winding, with said other terminal of said impedance ($Z_A$) connected to said common connection of said output electrodes of said switching devices,
a third winding ($N_1$) having a first terminal connected to said center tap of said first secondary winding and a second terminal connected through a unidirectional current conducting device to said common connection of said second terminals of said rectifier devices, a fourth winding ($N_2$) having a first terminal connected to said center tap of said second secondary winding and a second terminal connected through a unidirectional current conducting device,
a filter inductor ($L_F$) having one terminal coupled to said second terminal of said first winding, and a second terminal coupled to a source of potential, a filter capacitor ($C_F$) having one terminal coupled to said second terminal of said first winding and a second terminal coupled to said output electrode connection of said switching devices, a switching control circuit having control outputs connected to said control electrodes of said switching devices to cause power to be coupled to said secondary windings during a power stroke when one of said switching devices is on, and to cause power to be transfered back to said power source via said second winding and said auxiliary impedance.

10. The improved multiwinding inductor apparatus according to claim 9, wherein said auxiliary impedance includes a saturable reactor.

11. The improved multiwinding inductor apparatus according to claim 9, wherein said auxiliary impedance includes a magnetic amplifier.

12. The improved multiwinding inductor apparatus according to claim 9, wherein said auxiliary impedance includes a leakage path in said second winding.

13. The improved multiwinding inductor apparatus according to claim 9, wherein said auxiliary impedance is a nondissipative impedance.

14. The improved multiwinding inductor apparatus according to claim 9, wherein the turns ratio of said windings of said inductor are calculated according to the following:

$$\frac{N_x}{N_p} = \frac{V_x}{V_p}\left(\frac{1-\delta}{\delta}\right)$$

Where
$N_x$ = number of turns of selected winding
$N_p$ = number of turns of first winding ($N_p$)
$V_x$ = voltage across selected winding
$V_p$ = voltage across first winding
$\delta$ = duty cycle.

15. The improved multiwinding inductor apparatus according to claim 9, wherein said first and second switching devices are transistors having a base control electrod and a collector and emitter first and second electrode.

16. The improved multiwinding inductor apparatus according to claim 9, wherein said first and second secondary windings each have a resistor and a capacitor connected in shunt between said outer tap and said connected second terminals of said associated rectifiers.

17. The improved multiwinding inductor apparatus, according to claim 15, wherein said base electrodes are coupled to the outputs of a pulse width modulator.

18. The improved multiwinding inductor apparatus according to claim 17, further including an error amplifier having one input coupled to an output of one of said secondary windings and one input coupled to a reference level source, with the output of said amplifier coupled to a control input of said pulse width modulator for controlling said switching devices.

19. The improved multiwinding inductor apparatus according to claim 9, further including a third secondary winding associated with and coupled to said transformer, said third secondary winding having first and second terminals and a center tap, with a fifth rectifier having one terminal coupled to said first terminal of said third secondary winding with a sixth rectifier having one terminal coupled to said second terminal of said third secondary winding and with the second terminal of said rectifier coupled together with a parallel R-C network connected between said center tap of said third secondary winding and said common connection of said second terminals of said rectifiers.

* * * * *